United States Patent Office 3,423,483
Patented Jan. 21, 1969

3,423,483
FLUORESCENT POLYMERS
Tom Anyos, Parkersburg, W. Va., and Wendell W. Moyer, Jr., Wheaton, Ill., assignors to Borg-Warner Corporation, Chicago, Ill., a corporation of Illinois
No Drawing. Filed May 28, 1965, Ser. No. 459,886
U.S. Cl. 260—860        5 Claims
Int. Cl. C08g 51/67, 33/02, 39/10

ABSTRACT OF THE DISCLOSURE

Polymeric compositions that are permanently fluorescent due to the incorporation of from about .5 percent to about 1 percent of polybenzoxazole units in the polymeric chain.

---

Prior to this invention, fluorescent and/or whitening agents were added to preformed polymeric materials to provide polymers having desirable fluorescent characteristics. These fluorescent and/or whitening agents were added during a blending step after the polymer had been preformed. Some of the more common "brightening" agents utilized prior to this invention were oxacyanines, 2'-dihydroxybenzalazine, 1,4-di-2-(5-phenyloxazolyl) - benzene, etc. When adding these materials, it was not only necessary to have an additional processing step, but proper distribution was difficult to obtain and many times the whitener or brightening agent would be prevalent in one portion of the polymer and non-existent in another.

It has been found that low molecular weight polybenzoxazole units may be added to polyester polymers during the initial polymerization step and the resulting polymers will contain benzoxazole units chemically bound to the polymer chain. The incorporation of as little as .5% of the benzoxazole units in the polymer chain imparts permanent fluorescence to the polymers. Further, the fluorescent character obtained is evenly distributed throughout the polymer.

The polybenzoxazole utilized in this invention to prepare fluorescent polyesters are generally represented by the structural formula:

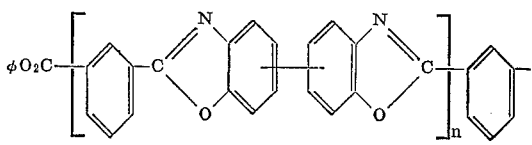

FORMULA I

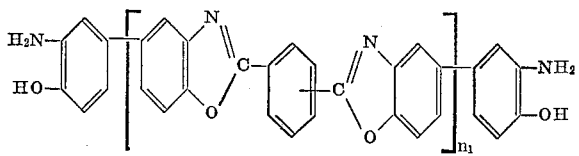

FORMULA II

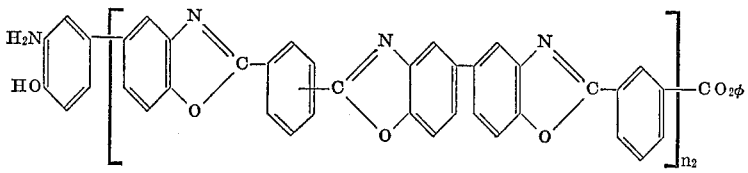

FORMULA III wherein $n$, $n_1$ and $n_2$ equals at least 2 and not greater than 10 or mixtures thereof and wherein $\phi$ denotes phenyl.

The polybenzoxazole units are obtained by the condensation of amino-hydroxybenzoic acids and also by the condensation of bis-(o-amino-phenols) and aromatic dicarboxylic acids. The units are incorporated in polyesters in amounts from about 0.5 percent by weight to about 1.0 percent by weight. Preparation of exemplary polybenzoxazole units is described hereinbelow.

EXAMPLE 1

Isophthalate polybenzoxazole prepared by copolymerization of 3,3'-dihydroxybenzidine with diphenyl isophthalate 3,3'-dihydroxybenzidine, 2.162 g. (0.010 mole) and 3.183 g. (0.010 mole) diphenyl isophthalate were carefully ground together in a mortar and transferred quantitatively to small side-arm test tube fitted with a nitrogen bubble tube. The tube was flushed for one hour with dry, oxygen-free nitrogen. A slow stream of nitrogen was thereafter maintained during the course of the reaction. The tube was suspended in a Woods metal bath and heated slowly to 370–400° C. over a 75-minute period. During the reaction, the mass softened, resolidified, and turned yellow in color. Both phenol and water were expelled easily during the reaction. The reaction mass was heated an additional four hours at between 300° C. and 320° C. A yield of 3.10 g. (100 percent) of yellow colored brittle resin was obtained. The polymer was completely soluble in sulfuric acid and partially soluble in trifluoroacetic acid. The polymer had an inherent viscosity of 0.43 (0.4 g./100 ml. $H_2SO_4$, 25° C.). The infrared spectrum was in agreement with the proposed structure. X-ray analysis indicated that the product was crystalline. The ultraviolet spectrum of the polymer in sulfuric acid showed maxima at 350 m$\mu$ and a specific extinction coefficient of 73.5. The polymer was nonflammable.

EXAMPLE 2

Terephthalate polybenzoxazole prepared by copolymerization of 3,3'-dihydrobenzidine with diphenyl terephthalate A ground mixture of 1.693 (0.0078 mole) 3,3'-dihydroxybenzidine and 2.492 g. (0.0078 mole) diphenyl terephthalate was charged to a small side-arm test tube fitted with a nitrogen bubble tube. The mixture was flushed with dry, oxygen-free nitrogen for a period of one hour prior to reaction, and a slow stream of nitrogen was maintained during the entire course of the polymerization. The tube was suspended in a Woods metal bath and gradually heated to 300° C. over a two-hour period. The temperature was maintained at between 300° C. and 330° C. for a further period of four hours. The reaction mixture changed in color from gray to pale cream, which then darkened during the course of the polymerization. Both phenol and water were expelled readily during the early stages. At no time did the reaction mass become molten. A yield of 2.42 g. (100 percent) of brittle, rust colored resin was obtained. The product was 55 percent soluble in concentrated sulfuric acid and had an inherent viscosity of 0.94 (0.25 g./100 ml. $H_2SO_4$, 25° C.). The infrared spectrum was in agreement with the suggested structure. The ultraviolet spectrum of the polymer in sulfuric acid showed broad maxima at 390 m$\mu$ and had a specific extinction coefficient of 35.0. The polymer was nonflammable in an open flame.

Virtually all of those polyester polymers and copolymers that are capable of copolymerizing with dicarboxylic acids or the end groups of the polybenzoxazole may be rendered fluorescent by the incorporation of polybenzoxazole units in accordance with this invention. Examples of a few of the more well known polyester polymers capable of copolymerizing with these end groups are the polycarbonates, polycarboxylates, carbonate-carboxylates, sulfonate-carboxylates, sulfonate-carbonates, polyurethanes, polyamides, mixtures of the aforementioned polymers as well as any other polymer containing polyester linking groups therein.

The polybenzoxazole units prepared as shown above are incorporated in a polycarbonate as follows:

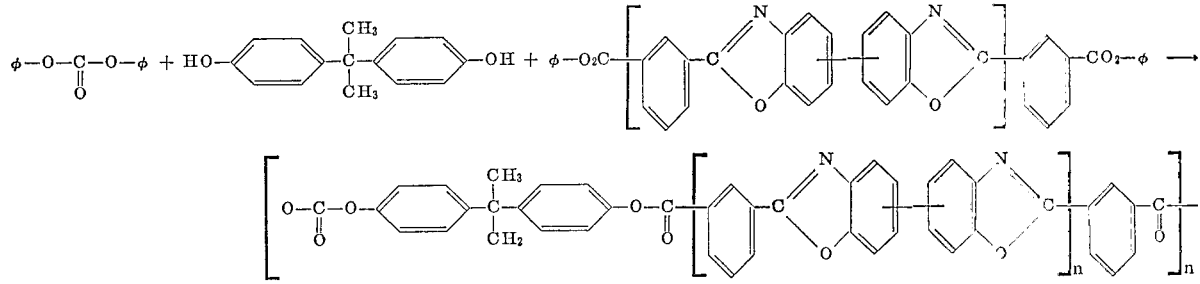

FORMULA IV

It will be noted from the above reaction of polybenzoxazole with polycarbonate that the polybenzoxazole units may be incorporated in any polyester system that will copolymerize with a carboxylate ester.

The specific method of preparing the polyesters with which the polybenzoxazole units are copolymerized does not form a part of this invention, however, it will be noted that a very wide range of condensation reactions may be utilized in preparing the fluorescent polymers of this invention. The preparation of the polycarbonates, polycarboxylates, polyamides, etc., or copolymers thereof, can take place as a solution polycondensation, interfacial polycondensation, melt polycondensation, etc.

For the purposes of illustration, the examples hereinbelow utilize a melt polycondensation to prepare polycarbonates and polycarboxylates.

It is, of course, necessary to add the preformed benzoxazole units to the polymer or copolymer condensation reaction in amounts from 0.5 percent to about one percent during the course of the polycondensation of the polymer forming monomers.

Examples showing the preparation of fluorescent polymers of this invention are set forth hereinbelow.

Example A.—Fluorescent polycarbonate 10.7110 g. (0.5 mole) diphenyl carbonate, 11.400 g. (0.5 mole) bisphenol-A, 0.1 g. polybenzoxazole and 0.1 g. magnesium powder were charged to a 200 ml. round-bottom flask equipped with nitrogen inlet tube. The flask was kept under nitrogen and heated in an oil bath for 36 hours at 225–250° C. The polymer was washed with acetone to remove unreacted monomer and dried at reduced pressure and 50° C. The product exhibits brilliant fluorescence under ultraviolet irradiation.

Example B.—Fluorescent polycarboxylate 5.224 g. (0.2 mole) diphenyl terephthalate, 1.240 g. (0.2 mole) ethylene glycol, 0.48 g. polybenzoxazole and 0.1 g. antimony oxide were charged to a polymerization tube equipped with a nitrogen inlet. The tube was swept with nitrogen and maintained under a nitrogen atmosphere while heated in a Woods metal bath at 200° for twelve hours. The product was washed repeatedly with acetone to remove unreacted monomers and dried at reduced pressure. The polycarboxylate polymer was lightly yellow in color and exhibited high fluorescence under ultraviolet irradiation.

Example C.—Fluorescent isophthalate-bisphenol-A based polymer 15.900 g. (0.5 mole) diphenyl isophthalate, 11.400 g. (0.5 mole) bisphenol-A and 0.3 g. polybenzoxazole were charged to a polymerization tube equipped with a nitrogen inlet. The tube was flushed with nitrogen and maintained under a nitrogen atmosphere while it was heated in an oil bath from 250°–285° for thirty hours. The product was washed with acetone to remove unreacted monomer and dried at reduced pressure. Upon exposure to ultraviolet irradiation a high fluorescence was noted.

From the foregoing examples, it will be noted that fluorescent polymers may be prepared without the necessity of adding a fluorescent agent in an additional process step. Further, the distribution of fluorescence throughout the polymer is obviously superior to that obtained by addition of dyes or pigments in that the fluorescent component is integral with respect to the units in the chain. It will be noted that the addition of the benzoxazole units in the polymer chain in amounts up to one per cent have very little effect on the physical and chemical properties inherent in the polymers. Also, the incorporation of benzoxazole units in the polymer chain does not, in any way, affect the addition of plasticizers, natural or synthetic resins, antioxidants, pigments, dyes, etc. that may be added to the polymers after condensation.

Although this invention has been described with respect to certain polymer systems, it will be understood that certain modifications may be made such as applying the polybenzoxazole units to other polyester systems that have not been described. These equivalents will be apparent to those skilled in the art. It is intended that such variations be included within the present invention and that the invention is limited only by the scope of the appended claims.

What is claimed is:

1. An aromatic polyester having incorporated in its polymer chain from 0.5 to 1.0 percent polybenzoxazole units of the formula

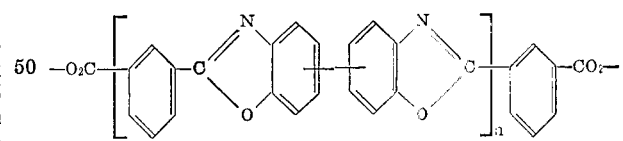

wherein $n$ is at least 2 and not greater than 10, said polyester polymer characterized by being fluorescent in the presence of ultraviolet light.

2. An aromatic polyester polymer having incorporated in its polymer chain from 0.5 to 1.0 percent polybenzoxazole units of the formula

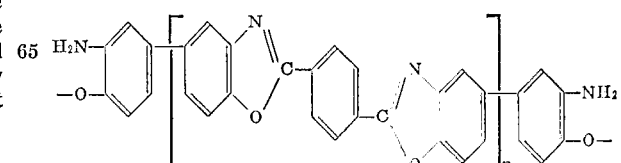

wherein $n$ is at least 2 and not greater than 10, said polyester polymer characterized by being fluorescent in the presence of ultraviolet light.

3. An aromatic polyester polymer having incorporated in its polymer chain from 0.5 to 1.0 percent polybenzoxazole units of the formula

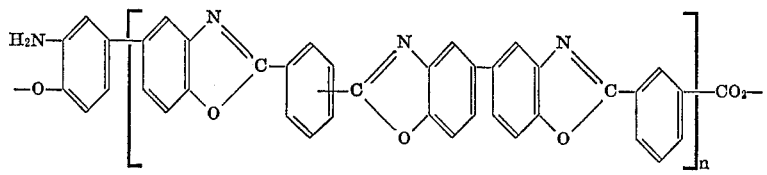

wherein $n$ is at least 2 and not greater than 10, said polyester polymer characterized by being fluorescent in the presence of ultraviolet light.

4. An aromatic polycarbonate having incorporated in its polymer chain from 0.5 to 1.0 percent polybenzoxazole units selected from the group consisting of

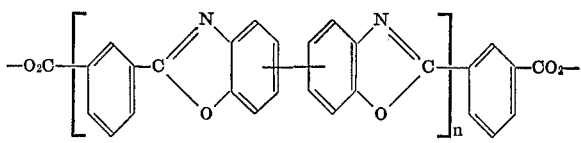

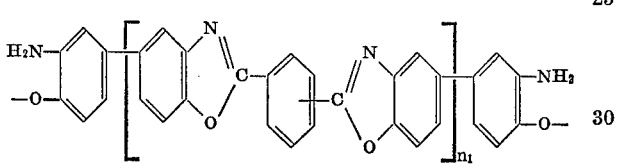

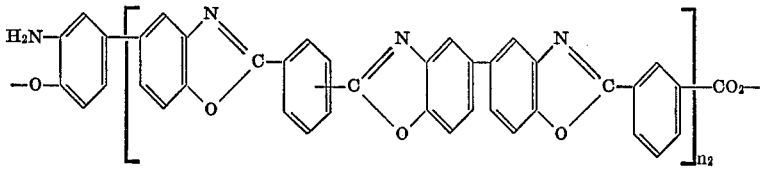

wherein $n$, $n_1$ and $n_2$ are at least 2 and not greater than 10, said polyester polymer characterized by being fluorescent in the presence of ultraviolet light.

5. An aromatic polyester having incorporated in its polymer chain from 0.5 to 1.0 percent polybenzoxazole units selected from the group consisting of

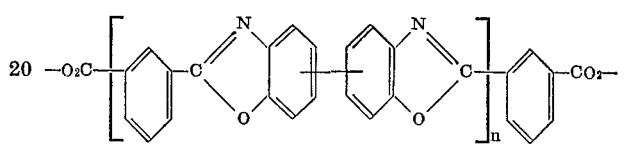

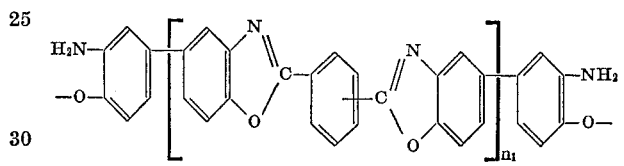

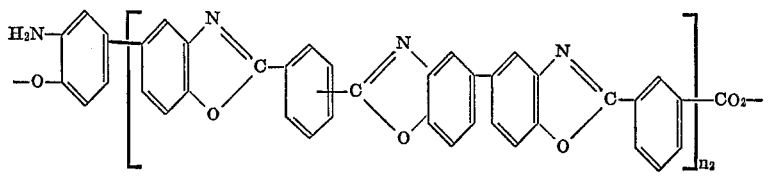

wherein $n$, $n_1$ and $n_2$ are at least 2 and not greater than 10, said polyester polymer characterized by being fluorescent in the presence of ultraviolet light.

References Cited

UNITED STATES PATENTS

| | | | |
|---|---|---|---|
| 2,904,537 | 9/1959 | Brinker et al. | 260—78 |
| 3,230,196 | 1/1966 | Moyer | 260—47 |
| 3,306,876 | 2/1967 | Kantor et al. | 260—860 |

OTHER REFERENCES

Kubota et al., "Journal of Polymer Science," Part B, vol. 2 (1964), pp. 655–659.

SAMUEL H. BLECH, *Primary Examiner.*

U.S. Cl. X.R.

260—47, 857, 858, 29.2, 31.2, 307; 252—301.2